Patented Dec. 10, 1929

1,739,315

UNITED STATES PATENT OFFICE

JOHN M. KESSLER, OF WEST ORANGE, AND OREGON B. HELFRICH, OF ORANGE, NEW JERSEY

ETHER-ALCOHOL ESTER OF FATTY ACIDS

No Drawing.     Application filed April 25, 1928. Serial No. 272,856.

The invention relates to esters of the higher fatty acids and to compositions, in which such esters are present as an ingredient, and includes correlated improvements and discoveries whereby and wherewith the knowledge of these esters, their properties and uses are enhanced.

An object of the invention is to provide new esters of the higher fatty acids possessing properties, chemical and physical, which render them of value in various compositions.

A further object of the invention is to provide new compounds formed by reaction between an aliphatic ether-alcohol and a higher member of the fatty acid series.

A more particular object of the invention is to provide new stearates or aliphatic ether-alcohol esters of stearic acid, which are readily and economically manufactured and which are well adapted as an ingredient of coating compositions, plastics, films and polishes.

Another object of the invention is to provide a composition of matter in which an aliphatic ether-alcohol ester of a higher fatty acid is an ingredient along with pyroxylin or nitrocellulose.

Other objects of the invention will in part be obvious and will in part appear hereinafter.

The invention accordingly comprises the new compounds and compositions of matter possessing the characteristics and properties which will be exemplified in the compound and composition of matter hereinafter described and the scope of the application of these will be indicated in the claims.

For a fuller understanding of the nature and objects of the invention, reference should be had to the following detailed description:

The new compounds or esters of the higher fatty acids are utilizable for the production of lacquers and the use of lacquers, other coating compositions, plastics, etc. and has become very extensive within the past few years; also the suggestions made and the studies undertaken to improve the quality and characteristics of these compositions have been many. The most extensive use has been that of the so-called pyroxylin lacquers, and the manufacture of these lacquers, more particularly, is now a considerable part of the paint and varnish industry, in which industry they have in a large measure displaced varnishes and oil enamels. The lacquers usually consist of pyroxylin dissolved in a mixture of volatile solvents and hydrocarbon diluents, to which there may be added a gum for the purpose inter alia of increasing the adhesion and appearance of the lacquer and a high-boiling, low-volatile compound, i. e. "plasticizing agent" for decreasing the brittleness of the film.

This invention provides new compounds which may be aligned with the "plasticizing agents" and in practice the invention may be carried out by bringing an aliphatic ether-alcohol, as diethylene glycol (otherwise designated as $\beta$, $\beta'$ dihydroxy ethyl ether), triethylene glycol, diethylene glycol ethyl ether (otherwise designated as $\beta$ hydroxy $\beta'$ ethoxy ethyl ether), diethylene glycol butyl ether (otherwise designated as $\beta$ hydroxy $\beta'$ butoxy ethyl ether) dipropylene glycol, ethylene propylene diglycol etc., or an ether derivative thereof by substituting a hydrocarbon radical for an H of an OH group as ethyl, propyl, butyl, amyl, etc. into interaction with a higher fatty acid having a carbon content greater than five, i. e. having more than five carbon atoms in the molecule, as capric, caproic, lauric, palmitic, stearic, oleic, linoleic, ricinoleic and others under conditions such that water is split out and an ester of the fatty acid formed. The esterification may be effectuated by heating the aliphatic ether-alcohol and the fatty acid under a reflux for a suitable period of time and preferably with an excess of the aliphatic ether-alcohol which may subsequently be removed and recovered by distillation. The mixture may be heated either alone or in the presence of a catalyst, for example, an acid as sulphuric acid and hydrochloric acid. The effect of the catalyst is, when such is employed, as in catalytic reactions generally, that of increasing the velocity of the reaction.

As an illustrative embodiment of a manner in which the invention may be carried out in practice, the following example is given:

A mixture of 300 gms. of diethylene glycol ethyl ether and 300 gms. of stearic acid are placed in a suitable vessel for heating, such vessel being provided with a reflux condenser and the mixture then heated under the reflux for a period of about three hours. The amount of diethylene glycol ethyl ether taken is in excess of that required to form the ester of stearic acid. This excess may be removed by distillation either in vacuo, or under ordinary pressure conditions. On cooling, the ester forms a solid mass. The equation with which the foregoing reaction may be considered as taking place is as follows:

$$C_{17}H_{35}COOH + HOC_2H_4OC_2H_4OC_2H_5 =$$
$$C_{17}H_{35}COOC_2H_4OC_2H_4OC_2H_5 + H_2O$$

The diethylene glycol ethyl ether ester of stearic acid thus obtained melts at 55—60 degrees C. The acidity is less than .5 per cent, and the specific gravity at 65 degrees C is .886. It has a flash-point of about 225 degrees C., is soluble in ordinary alcohols and in hydrocarbon solvents and is well adapted for use generally as a plasticizing agent in lacquers, plastics, coating compositions, films and polishes. Among the advantages which it possesses for utilization in coating compositions are its stability and freedom from possible arising of a rancid odor upon aging, and its low volatility which perpetuates the flexibility of the composition of which it forms an ingredient.

Diethylene glycol and its alkyl substitution products, as diethylene glycol ethyl ether have, during the last few years, been placed upon the market in large quantities and at a low price, and accordingly the manufacture of new compounds, herein described, may be readily carried out upon a commercial scale with an assured supply of raw materials and at a low cost.

Furthermore there may be used a mixture of aliphatic ether-alcohols or their substitution products with a given fatty acid, or a given aliphatic ether-alcohol may be caused to react with a mixture of fatty acids or a mixture of aliphatic ether-alcohols and a mixture of fatty acids may be employed and it will be understood that the invention includes such variants within its scope.

Since certain changes may be made with respect to the above compounds and compositions of matter and different embodiments of the invention could be made without departing from its scope it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As new compounds, the aliphatic ether-alcohol esters of the fatty acids having a carbon content greater than five.

2. As new compounds, the substituted aliphatic ether-alcohol esters of the fatty acids having a carbon content greater than five.

3. As new compounds, the diethylene glycol esters of the fatty acids having a carbon content greater than five.

4. As new compounds, the diethylene glycol ethyl ether esters of the fatty acids having a carbon content greater than five.

5. As new compounds, the aliphatic ether-alcohol esters of stearic acid.

6. As new compounds, the diethylene glycol esters of stearic acid.

7. As a new compound, the diethylene glycol ethyl ether ester of stearic acid.

8. A composition of matter, containing as an ingredient an aliphatic ether-alcohol ester of a fatty acid having a carbon content greater than five.

9. A composition of matter, containing as an ingredient a diethylene glycol ester of stearic acid.

10. A composition of matter containing as an ingredient the diethylene glycol ethyl ether ester of stearic acid.

11. A composition of matter comprising an ester of an aliphatic acid, containing more than ten carbon atoms to the molecule, with an ether-alcohol.

12. A composition of matter comprising an ester of an aliphatic acid, containing more than ten carbon atoms to the molecule, with an ether of a glycol.

13. A composition of matter comprising an ester of an aliphatic acid, containing more than ten carbon atoms to the molecule, with diethylene glycol.

14. A composition of matter comprising a laurate of an ether-alcohol.

15. A composition of matter comprising a laurate of an ether of a glycol.

16. A composition of matter comprising an ester whose composition is expressed by the general formula $$C_{11}H_{23}COO.CH_2.CH_2.O.CH_2.CH_2.R_1,$$

in which $R_1$ represents a monovalent radical.

17. A composition of matter comprising an ester of a saturated aliphatic acid, containing more than ten carbon atoms to the molecule, with an ether-alcohol.

18. A composition of matter comprising an ester of a saturated aliphatic acid, containing more than ten carbon atoms to the molecule, with diethylene glycol.

19. A composition of matter comprising an ester of an aliphatic acid containing more than ten carbon atoms to the molecule with an alcohol containing originally at least two hydroxyl groups and at least one ether group.

In testimony whereof we affix our signatures.

JOHN M. KESSLER.
OREGON B. HELFRICH.